United States Patent
Joshi et al.

(10) Patent No.: US 11,425,059 B2
(45) Date of Patent: Aug. 23, 2022

(54) CHATBOT SUPPORT PLATFORM

(71) Applicant: Accenture Global Solutions Limited, Dublin (IE)

(72) Inventors: Amrish Joshi, Indore (IN); Sanjoy Ghosh, Pune (IN); Vedika Vinay Sawant, Pune (IN); Prashant Saxena, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 91 days.

(21) Appl. No.: 16/444,609

(22) Filed: Jun. 18, 2019

(65) Prior Publication Data

US 2020/0403944 A1 Dec. 24, 2020

(51) Int. Cl.
| | | |
|---|---|---|
| *H04L 51/02* | (2022.01) | |
| *H04L 41/00* | (2022.01) | |
| *G06F 9/54* | (2006.01) | |
| *G06F 16/9535* | (2019.01) | |
| *G06F 16/23* | (2019.01) | |
| *H04L 41/50* | (2022.01) | |

(52) U.S. Cl.
CPC .............. *H04L 51/02* (2013.01); *G06F 9/547* (2013.01); *G06F 16/2365* (2019.01); *G06F 16/9535* (2019.01); *H04L 41/20* (2013.01); *H04L 41/50* (2013.01)

(58) Field of Classification Search
CPC ......... H04L 51/02; H04L 41/50; H04L 41/20; G06F 9/547; G06F 16/9535; G06F 16/2365
See application file for complete search history.

(56) References Cited

U.S. PATENT DOCUMENTS

| | | | | |
|---|---|---|---|---|
| 10,263,908 | B1* | 4/2019 | Ganjoo | ............... H04L 41/5067 |
| 10,417,567 | B1* | 9/2019 | Miller | .................... G06N 3/006 |
| 2011/0125734 | A1* | 5/2011 | Duboue | ................... G09B 7/00 |
| | | | | 707/723 |
| 2011/0179007 | A1* | 7/2011 | Shi | ........................ G06F 16/958 |
| | | | | 707/706 |
| 2012/0180022 | A1* | 7/2012 | Hopkins | ................... G06F 8/30 |
| | | | | 717/100 |
| 2015/0379428 | A1* | 12/2015 | Dirac | ..................... G06N 20/00 |
| | | | | 706/12 |
| 2016/0314546 | A1* | 10/2016 | Malnati | ................ G06Q 50/163 |
| 2018/0018579 | A1* | 1/2018 | Xu | ......................... G06N 20/20 |
| 2018/0075847 | A1* | 3/2018 | Lee | ..................... G06F 16/3329 |
| 2020/0244788 | A1* | 7/2020 | Adams | .................. H04M 1/271 |

(Continued)

*Primary Examiner* — Scott B Christensen

(74) *Attorney, Agent, or Firm* — Harrity & Harrity, LLP

(57) ABSTRACT

A device receives, based on a user interaction with a chatbot, request data for a request for a service associated with a software tool that is part of a service management system. The device identifies, based on the request data, the service that is being requested and a first set of entity data for a first set of entities relating to the service. The device obtains a second set of entity data for a second set of entities by using an application programming interface (API) to reference a data structure that is associated with the service management system and that stores the second set of entity data. The device causes one or more components of the service management system to use the first set of entity data to execute a set of actions to perform the service.

20 Claims, 9 Drawing Sheets

(56) References Cited

U.S. PATENT DOCUMENTS

| | | | |
|---|---|---|---|
| 2020/0287856 A1* | 9/2020 | Price | H04L 51/18 |
| 2020/0327449 A1* | 10/2020 | Tiwari | H04L 41/5067 |
| 2020/0349214 A1* | 11/2020 | Tang | G06F 40/20 |
| 2020/0379836 A1* | 12/2020 | Vaughn | G06K 9/6262 |

* cited by examiner

CHATBOT SUPPORT PLATFORM

BACKGROUND

A chatbot is capable of engaging in a conversation with users. For example, a user may interact with an interface of a device to provide input as part of a conversation with the chatbot (e.g., audio input, text input, and/or the like). The chatbot may use one or more analyses including speech-to-text, natural language processing, and/or the like to analyze the input and/or to determine an appropriate response to the input.

SUMMARY

According to some implementations, a method may include receiving, based on a user interaction with a chatbot, request data for a request for a service associated with a software tool that is part of a service management system. The method may include identifying, based on the request data, the service that is being requested and a first set of entity data for a first set of entities relating to the service. The method may include determining, based on the service identifier and the first set of entity data, that a second set of entity data for a second set of entities is needed in order to provide the service. The method may include obtaining the second set of entity data for the second set of entities based on at least one of: another user interaction with the chatbot, or a search query to reference a data structure that is associated with the service management system and that stores the second set of entity data. The method may include causing a validation procedure to be performed to validate the first set of entity data or the second set of entity data. The method may include causing one or more components of the service management system to use validated entity data to execute a set of actions to perform the service.

According to some implementations, a device may include one or more memories, and one or more processors, operatively coupled to the one or more memories, to determine to provide a user with a service associated with a software tool that is part of a service management system based on: request data for a request that the user has submitted for the service based on a user interaction with a chatbot, or recommendation data for a recommendation to provide the user with the service based on user activity data associated with one or more operations performed by the user via the software tool. The one or more processors may identify entity data for a set of entities relating to the service, wherein the entity data is identified from at least one of: the request data, a user interaction with the chatbot, or a data structure that is associated with the service management system and that stores the entity data. The one or more processors may cause a validation procedure to be performed to validate the entity data. The one or more processors may cause one or more components of the service management system to use validated entity data to execute a set of actions to perform the service.

According to some implementations, a non-transitory computer-readable medium may store one or more instructions. The one or more instructions, when executed by one or more processors of a device, may cause the one or more processors to: receive, based on a user interaction with a chatbot, request data for a request for a service associated with a software tool that is part of a service management system. The one or more instructions may cause the one or more processors to identify, based on the request data, the service that is being requested. The one or more instructions may cause the one or more processors to identify, based on the request data, a first set of entity data for a first set of entities relating to the service. The one or more instructions may cause the one or more processors to obtain a second set of entity data for a second set of entities by using an application programming interface (API) to reference a data structure that is associated with the service management system and that stores the second set of entity data. The one or more instructions may cause the one or more processors to cause one or more components of the service management system to use the first set of entity data and the second set of entity data to execute a set of actions to perform the service.

DETAILED DESCRIPTION

Figure 1A:
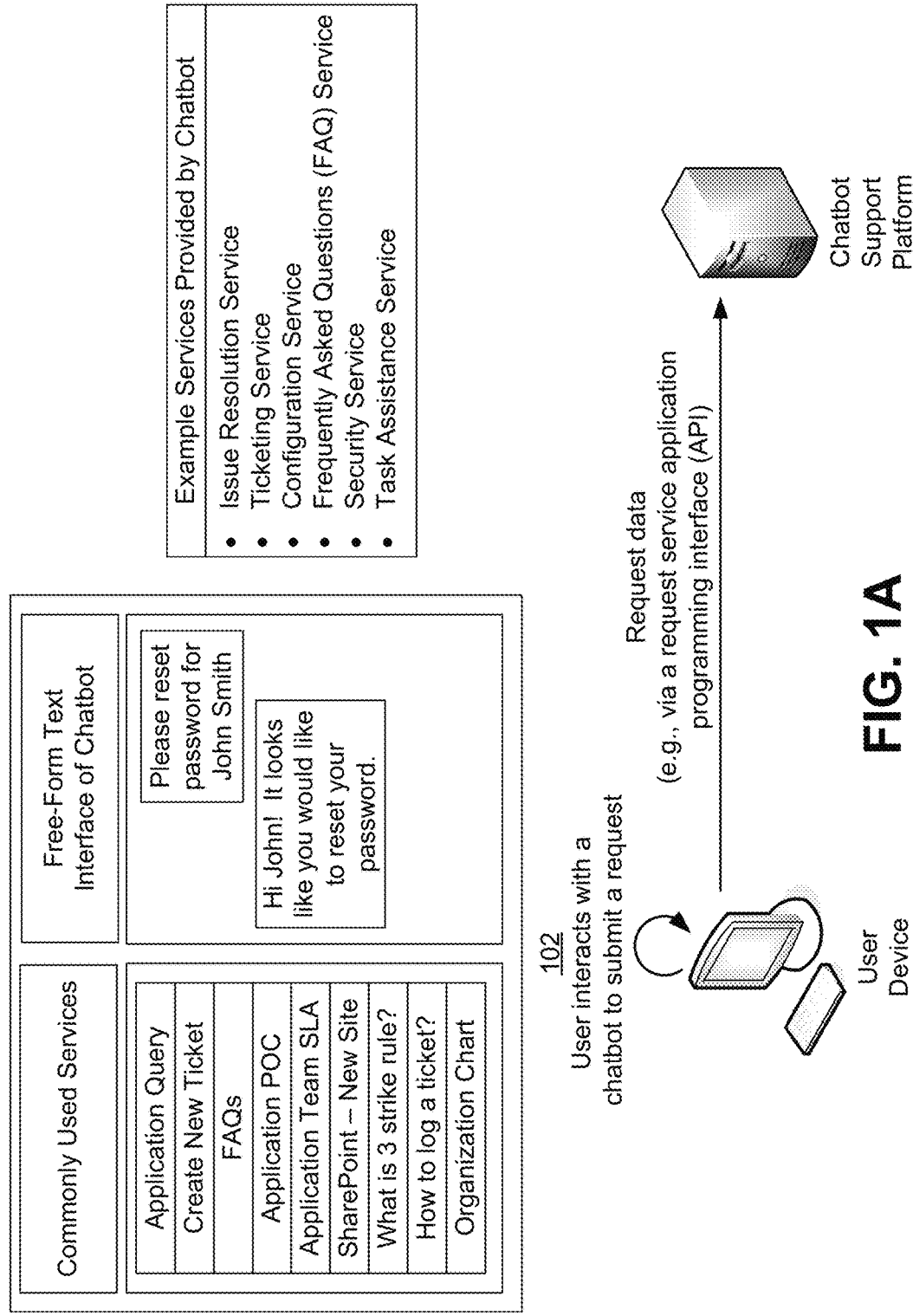
FIGS. 1A-1D are diagrams of one or more example implementations described herein.

The following detailed description of example implementations refers to the accompanying drawings. The same reference numbers in different drawings may identify the same or similar elements.

A service management system may be used to management end-to-end processes of an organization. The service management system may include service management tools, such as project management tools, information technology (IT) management tools, supply chain management tools, human resources management tools, customer service management tools, and/or the like. In some cases, the organization may use a help desk team and/or an application management support (AMS) team to assist users with issues that may arise while using the service management tools. In other cases, a chatbot may be implemented to assist users. For example, a chatbot may be implemented that is able to use natural language processing to understand a query made by a user and to provide the user with a response to the query.

However, a chatbot may be an ineffective solution if implemented within a complex service management system. For example, the service management system may include multiple sub-systems that each support different software tools, where the sub-systems and/or software tools are provided by different vendors, utilize different technology platforms, are frequently updated and/or affected by technology upgrades, reference data from different data sources (e.g., which may be of different file types and/or file formats), and/or the like. In this case, the chatbot may not be able to accurately respond to the broad range of queries made by users and/or may not be able to efficiently and/or effectively respond to the queries. This wastes resources (e.g., processing resources, network resources, and/or the like) when the chatbot responds to a query with a response that is not helpful to the user, wastes resources when the user then attempts to manually look up a solution to an issue, when the user ignores the issue and continues to perform a task that may be performed less efficiently due to the chatbot being unable to resolve the issue, and/or the like.

Some implementations described herein provide a chatbot support platform with access to a set of application programming interfaces (APIs) associated with a service management system, where the set of APIs permit the chatbot support platform to interact with one or more components of the service management system to provide a service to a user. For example, the user may encounter an issue while interacting with a software tool that is part of the service management system and may interact with an interface of a chatbot that is displayed on a user device to submit a request for the service (e.g., the service may be a service to correct the issue). This may cause request data for the request to be provided to the chatbot support platform.

Additionally, the chatbot support platform may process the request data to identify the service being requested by the user and to identify entity data that is needed to provide the user with the service. For example, the chatbot support platform may use a first API to access a data model that uses machine learning to identify the service requested by the user and that uses natural language processing to identify a first set of entity data for a first set of entities relating to the service. As an example, the user may interact with the interface of the chatbot to input: "Please reset the password for John Smith." In this example, the chatbot support platform may use the first API and the data model to identify the service as a password reset service and to identify a name of the user (e.g., John Smith), which may be needed to satisfy the request.

Furthermore, the chatbot support platform may obtain a second set of entity data for a second set of entities relating to the service. For example, in some cases, the user may not provide sufficient information to satisfy the request. In these cases, the chatbot support platform may obtain missing information from the user (i.e., particular entity data of the second set of entity data) by requesting the missing information via the chatbot. Additionally, or alternatively, the chatbot support platform may obtain additional information (e.g., particular entity data of the second set of entity data) that is needed to satisfy the request, such as by using a second API to obtain the additional information from a data structure associated with the service management system. Moreover, the chatbot support platform may use a third API to cause one or more components of the service management system to perform a set of actions to provide the user with the service.

In this way, the chatbot support platform provides the service to the user that is accessing the software tool that is part of the service management system. Furthermore, by configuring the chatbot support platform with access to a set of APIs, the chatbot support is able to interact with any component (or some components) of the service management system. This allows the chatbot support platform to obtain different types of data needed to provide the service, to verify that particular data provided by the user is sufficient to provide the service, and/or the like, thereby conserving resources (e.g., processing resources, network resources, and/or the like) that an inferior chatbot would waste by providing unhelpful data to the user (e.g., in response to the request), conserving resources that a user device associated with the user would waste attempting to manually solve the issue, and/or the like. Moreover, some implementations described herein permit the chatbot support platform to use machine learning to recommend services to the user without the user needing to submit the request (as further described elsewhere herein). This conserves resources by providing the user with the service without the user needing to submit a request to the chatbot, conserves resources by pre-emptively avoiding issues that would have been caused without the recommended service, and/or the like.

FIGS. 1A-1D are diagrams of one or more example implementations 100 described herein. For example, example implementation(s) 100 may include a user device, a chatbot support platform, and a service management system. As shown in FIGS. 1A-1D, the chatbot support system may support a chatbot that is able to provide a service to a user that is accessing a software tool associated with a service management system.

The service management system may include a collection of systems that support a set of software tools that are used by an organization. For example, the service management system may include a Systems Applications and Products (SAP) system, an enterprise resource planning (ERP) system, a customer-relationship management (CRM) system, a content management system (CMS), an application management support (AMS) system, and/or any other similar type of system (e.g., an open system that utilizes interoperability, portability, open source standards, and/or the like). One or more of the systems may be supported by cloud service providers, on-site servers, data storage devices, and/or the like.

The set of software tools may be used by users associated with the organization, such as an employee of the organization, an agent of the organization, a customer of the organization, and/or the like. The set of software tools may be used to perform a role, complete a task, provide a service, and/or the like. The set of software tools may include project management tools, information technology (IT) management tools, supply chain management tools, human resources management tools, customer service management tools, and/or the like. In some implementations, the service management system may include systems and/or software tools that are supported by different vendors, that are supported by different technology platforms, that provide services that process data of different file types and/or file formats, and/or the like.

One or more implementations described herein refer to a set of application programming interfaces (APIs). For example, the chatbot support platform may use a set of APIs to communicate with one or more components of the service management system. The set of APIs may include a request service API, an identify service API, one or more supplemental data APIs, a validation API, one or more service performance APIs, an electronic mail (e-mail) adaptor API, a recommended service API, and/or the like, each as described further herein. The set of APIs may include open APIs, partner APIs, internal APIs, composite APIs, and/or the like. Additionally, the set of APIs may utilize representational state transfer (REST) technology, a simple object access protocol (SOAP) protocol, and/or the like.

As shown in FIG. 1A, and by reference number 102, the user may interact with a chatbot interface that is displayed on the user device to submit a request. For example, the chatbot may offer a set of services to the user and an interface of the chatbot may permit the user to input and submit a request. The set of services may include an issue resolution service, a ticketing service, a configuration service, a frequently asked questions (FAQ) service, a security service, an approval service, a task assistance service, and/or the like.

The issue resolution service and/or the ticketing service may assist the user with correcting an issue that has occurred while the user is interacting with a software tool that is part of the service management system. The configuration service may include provisioning a site with a software upgrade and/or an installation of new hardware, adjusting permissions for a class of users at a site, and/or the like. The FAQ service may provide the user with answers to frequently asked questions, such as questions relating to service-level agreements (SLAs), key performance indicators (KPIs), points of contact (PoCs) for work streams, escalation matrices, and/or the like. The security service may include one or more application-level security services that provide security to the set of software tools. The task assistance service may assist the user in performing a task and/or an operation that is part of a task. For example, the software tool may be used by an administrator to view summary statistics relating to the organization, and the task assistance service may be used as a job aid to assist the administrator in effectively utilizing the software tool. As another example, the software tool may be used for approvals of a purchase requisition (PR) and purchase order (PO) workflow, and the task assistance service may assist a particular user with completion of an approval workflow.

In some implementations, the chatbot may be hosted by the chatbot support platform and may be part of the service management system. Additionally, or alternatively, the chatbot may be hosted by the user device and be part of the service management system. Additionally, or alternatively, the chatbot may be hosted by the chatbot support platform and/or the user device and may be external to the service management system.

In some implementations, the chatbot may include one or more interfaces that permit the user to submit a request for a service. For example, an interface of the chatbot may display a first area (shown in FIG. 1A as Commonly Used Services) that allows the user to select services (such as commonly used services) from a menu, may display a second area (shown as Free-Form Text Interface of Chatbot) for the user to input free-form text as part of the request, may display a button that allows the user to submit a voice-activated request, may display a button that allows the user to upload a document as part of the request, and/or the like.

In some implementations, the user device may provide the request data for the request to the chatbot support platform. For example, when the user submits the request, the user device may use a request service API to provide the request data to the chatbot support platform. The request data may include a service identifier for the service (e.g., if the user selected the service from a menu of available services), entity data for a first set of entities, where the entity data serves as parameters that are needed in order to satisfy the request (as further defined in FIG. 1B), and/or the like.

In the example shown, the user may interact with the free-form text interface of the chatbot to input the phrase: "Please reset password for John Smith." This may cause the user device (e.g., using the chatbot) to generate request data that includes the text input by the user and to provide the request data to the chatbot support platform.

In some implementations, the chatbot support platform may convert the request data to a standardized format. For example, if the user utilizes a voice-activated request feature of the chatbot, the request data provided to the chatbot support platform may be audio data. In this case, the chatbot support platform may convert the audio data to text data, such that the text data may be further processed by the chatbot support platform. In some implementations, the chatbot support platform may be configured with a universal entity mapping interface (UEMI). The UEMI may associate existing data formats used by the service management system with a standardized format (e.g., using a new custom class). In this case, the chatbot support platform may be configured to use the UEMI to dynamically convert request data in the existing data formats to the standardized format (e.g., using the new custom class).

In this way, the chatbot support platform receives request data that may be further processed to provide the user with the service.

Figure 1B:
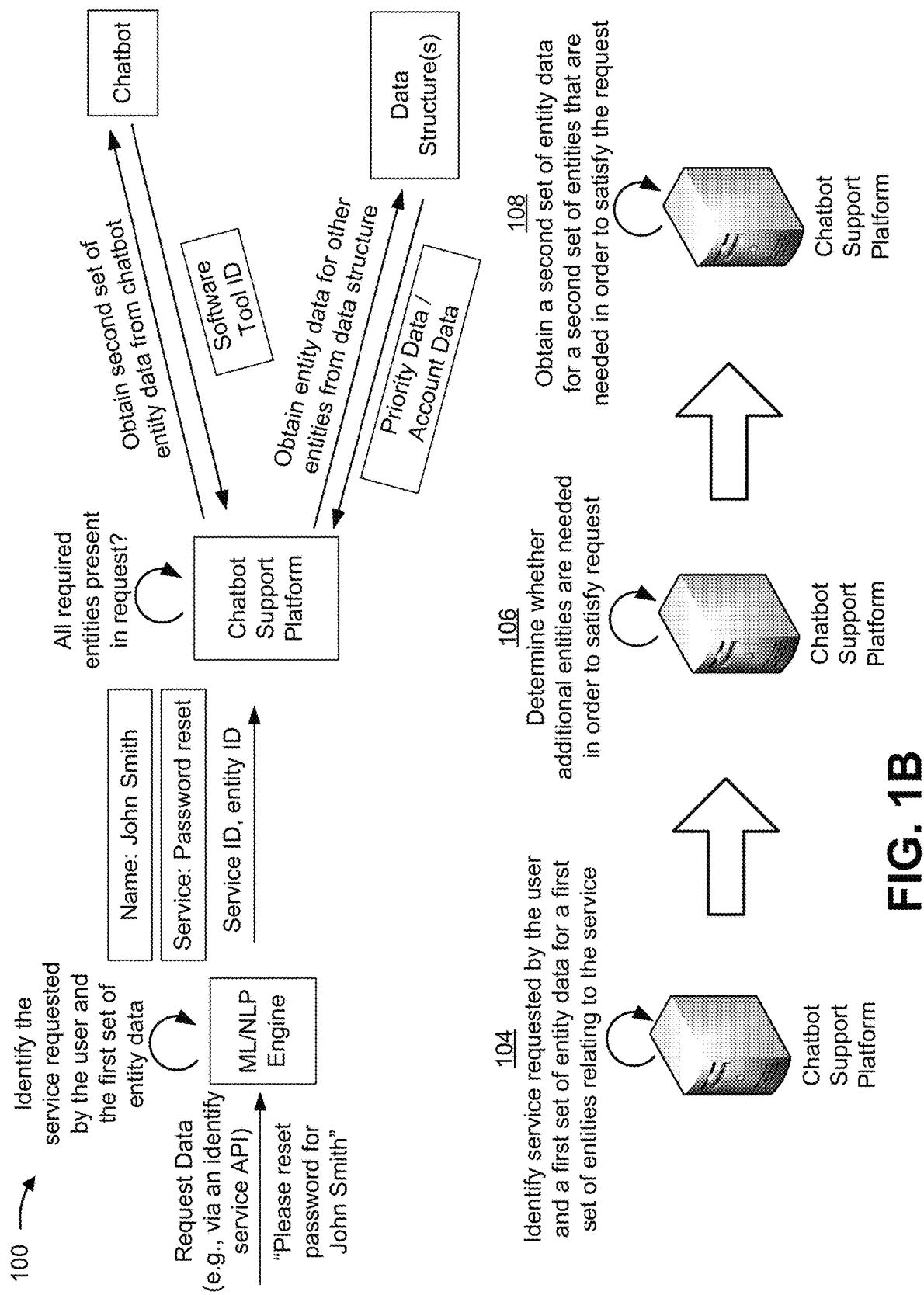

As shown in FIG. 1B, and by reference number 104, the chatbot support platform may identify the service requested by the user and a first set of entity data for a first set of entities relating to the service. For example, the chatbot support platform may process the request data to identify the service requested by the user and to identify the first set of entity data for the first set of entities relating to the service. The first set of entity data may serve as parameters that are needed in order to satisfy the request, and may include an identifier of the user, an identifier of the user device, an identifier of the organization associated with the user, an identifier of a software tool, an identifier of a system within the service management system, an identifier of the service management system, an identifier of a role that the user has within the organization, an identifier of an operation that is capable of being performed as part of the role, an identifier of a priority level of the service requested by the user, and/or the like.

In some implementations, the chatbot support platform may identify the service requested by the user based on a service identifier included in the request. For example, if the user selected the service from a drop-down menu or similar interface feature, the request data may have included a service identifier for the service. This allows the chatbot support platform to process the request data to identify the service identifier for the service. In some cases, the user may have described the service using free-form text. In these cases, the chatbot support platform may identify the service and the first set of entity data using machine learning and natural language processing, as described below.

In some implementations, the chatbot support platform may use a data model that is hosted by another device or platform. For example, a data model may have been trained by another device and the chatbot support platform may use the data model to identify the service requested by the user. In this case, the chatbot support platform may provide, via an identify service API, the data model with the request data to cause the data model to output a set of service scores that indicate the likelihoods of particular terms identifying particular services (e.g., that are part of a set of available services). Additionally, the other device or platform may select a service, of the set of available services, based on the set of service scores, and may use the identify service API to provide the chatbot support platform with a service identifier for the selected service.

In some implementations, the chatbot support platform may use a data model that has been trained using machine learning to identify the service requested by the user. For example, the chatbot support platform may train a data model using one or more machine learning techniques such that the data model is able to receive request data as an input and is able to output a set of service scores that indicate likelihoods of particular terms (e.g., included in the request) identifying particular services, of a set of available services. The one or more machine learning techniques may include a classification-based technique, a regression-based technique, a clustering-based technique, a technique using a neural network, and/or the like.

In some implementations, the chatbot support platform may receive historical data that may be used to train the data model. For example, over time, users may have interacted with an older version of the chatbot to submit requests for services and/or may have interacted with another type of help desk support system. In this case, the chatbot support platform may perform a set of feature identification techniques to process the historical data to determine a set of features that may be used to train the data model. The set of features may include values (e.g., numerical values, character values, and/or the like) that serve as indicators of whether terms included in a given request are indicative of a particular service. The set of feature identification techniques may include a technique that involves text mining and latent semantic analysis (LSA), a trend variable analysis technique, an interest diversity analysis technique, a technique using a neural network, a composite indicators analysis technique, a clustering technique, a regression technique, and/or the like. As an example, the historical data may include historical requests that include the terms "password," "reset," "login problems," and/or the like, which may be terms that are indicative of particular users submitting requests to reset passwords.

In some implementations, the chatbot support platform may train the data model based on the set of features. For example, the chatbot support platform may train a neural network based on the set of features. The neural network may have an input layer, one or more intermediate layers (e.g., a fully connected layer, a convolutional layer, a pooling layer, a recurrent layer, and/or the like), and an output layer. The set of features may be hyperparameters that are used as part of a cost function of the neural network. In this case, the chatbot support platform may perform a feedforward technique to provide particular historical data (e.g., that is part of a test dataset) as input to the neural network, and the neural network may output service scores that indicate likelihoods of particular terms being indicators of a particular service.

Additionally, the chatbot support platform may compare the one or more service scores to known values and may determine an error value based on the comparison between the one or more scores and the known values. The error value may be used to update the cost function (e.g., which may assign weights to particular features of the set of features), and the chatbot support platform may perform a backpropagation technique to iteratively train the neural network until a threshold level of accuracy has been reached. In this way, the neural network may be trained to receive request data as input and may output a set of service scores that indicate likelihoods of particular terms of a request being indicative of particular services. This may allow the chatbot support platform to select a service based on the set of service scores (e.g., by selecting a service score associated with a highest available confidence value, by selecting a service score that satisfies a threshold value, and/or the like).

In some implementations, the chatbot support platform may receive a trained data model. For example, a data model may be trained by another device and may be provided to the chatbot support platform.

In some implementations, the chatbot support platform may use the identify service API to identify the first set of entity data for the first set of entities relating to the service. For example, the chatbot support platform may use the identify service API to provide the other device or platform with the request data. This may cause the other device or platform to identify the service (as described above) and to identify the first set of entity data. For example, the other device or platform may use a set of natural language processing techniques to process the request data to identify the first set of entity data. The set of natural language processing techniques may include one or more syntax-driven natural language processing techniques (e.g., a parts of speech (PoS) tagging technique, a lemmatization technique, a parsing technique, and/or the like), one or more semantic-driven natural language processing techniques (e.g., a named entity recognition (NER) technique, an optical character recognition (OCR) technique, a sentiment analysis technique, and/or the like), and/or the like. Additionally, the other platform or device may use the identify service API to provide the first set of entity data to the chatbot support platform.

In the example shown, the chatbot support platform may provide, using the identify service API, the request data to the other device or platform (e.g., which may support a machine learning engine and/or a natural language processing engine). The request data may include free-form text stating, e.g., "Please reset password for John Smith." In this example, the other device or platform may use the machine learning engine (e.g., which supports the data model described above) to process the request data to identify the service requested by the user (e.g., shown as a password reset service). Additionally, the other device or platform may use the natural language processing engine (e.g., which supports the set of natural language processing techniques described above) to identify the first set of entity data for the one or more entities (e.g., a first entity that is the name of the user and is shown as John Smith).

In some implementations, the chatbot support platform may use the set of natural language processing techniques to identify the first set of entity data for the first set of entities relating to the service. For example, the chatbot support platform may be configured with the set of natural language processing techniques (defined above) that may be used to identify the first set of entity data (e.g., instead of using the identify service API, in addition to using the identify service API, and/or the like).

In some implementations, the chatbot support platform may be unable to identify the service that is being requested by the user. For example, the chatbot support platform may use the identify service API or may attempt to identify the service locally (e.g., using the data model described above). In this case, if the other device or platform (or the chatbot support platform) is unable to identify the service (e.g., the data model may be unable to accurately identify a new service that is being offered), then the chatbot support platform may cause the data model to be retrained such that the data model is able to identify the service in subsequent requests made by users. For example, the chatbot support platform may provide error message data describing the failed identification to a device accessible to a system administrator, and the system administrator may retrain the data model. In other cases, the chatbot support platform may automatically retrain the data model (e.g., by adjusting weights of a neural network, and/or the like).

As shown by reference number 106, the chatbot support platform may determine whether additional entities are needed in order to satisfy the request. For example, the chatbot support platform may compare the first set of entity data and a configured set of entity data associated with the identified service to determine whether additional entities are needed in order to satisfy the request. The configured set of entity data may represent a set of entities that are required to satisfy the request. In this case, the configured set of entity data may be stored using a data structure and the chatbot support platform may reference the data structure to determine whether each entity that is needed to satisfy the request has been provided by the user.

In the example shown, the chatbot support platform may compare the first set of entity data and a configured set of entity data. Additionally, assume the configured set of entity data includes an identifier of the user (e.g., the name of the user), an identifier of the software tool identifier and/or system to which the user has an account (e.g., the account that the user is unable to access due to having forgotten his or her password), and a priority identifier that indicates a priority level of the request (e.g., relative to the other requests provided to the service management system, to a sub-system within the service management system, and/or the like). In this example, the chatbot support platform may use the service identifier to reference the configured set of entity data (e.g., which may be stored via the data structure) and may compare the first set of entity data and the configured set of entity data to determine that additional entities are needed in order to satisfy the request. For example, when submitting the request, the user may not have specified the software tool and/or system to which the user has an account (e.g., which is needed to reset the user's password), may not have specified a priority level of the request (e.g., this data type may be pre-configured and not provided by the user), and/or the like.

In some implementations, the chatbot support platform may identify one or more supplemental data APIs and/or storage locations for the additional entity data (referred to hereafter as a second set of entity data) that is needed in order to satisfy the request. For example, the chatbot support platform may, after determining that the additional entity data is needed in order to satisfy the request, reference a data structure that associates one or more identifiers for the additional entity data with one or more supplemental data APIs that may be used to obtain the additional entity data from a component of the service management system, with a storage location for the additional entity data, with a set of instructions that specify how to obtain the additional entity data from the component of the service management system and/or the storage location, and/or the like. The additional entity data may be referred to hereafter as a second set of entity data.

As shown by reference number 108, the chatbot support platform may obtain a second set of entity data for a second set of entities that are needed in order to satisfy the request. For example, the chatbot support platform may obtain the second set of entities by causing the chatbot to request the second set of entities from the user device (e.g., via the request service API), by performing a search query to reference a data structure that is being used to store the second set of entity data, and/or the like, each as described below.

In some implementations, the chatbot support platform may obtain particular entity data, of the second set of entity data, by causing the chatbot to request the particular entity data from the user device. For example, the chatbot support platform may cause an interface of the chatbot to present text that requests the particular entity data, to project audio that requests the particular entity data, and/or the like. This may cause the user to interact with the interface of the chatbot to provide, via the request service API (or a similar type of API), the chatbot support platform with response data that includes the particular entity data.

In the example shown, the chatbot support platform (e.g., using the dialogue context manager) may cause the free-form text interface of the chatbot to display a message requesting that the user specify the name of the software tool on which the user is requesting to have the password reset procedure performed. In this example, the user may interact with the interface of the chatbot to provide the name of the software tool, thereby causing data identifying the software tool to be provided to the chatbot support platform.

Additionally, or alternatively, the chatbot support platform may obtain particular entity data, of the second set of entity data, by performing a search query to reference one or more data structures associated with the service management system. For example, one or more data structures associated with the service management system may be used to store particular entity data that is needed to provide the user with particular services. To provide a few examples, the one or more data structures may store priority data that specify a priority level of the service requested by the user (e.g., which may assigned to a ticket associated with the user's request), account data for the user and/or historical data for the user (e.g., which may include data needed to provide the user with the service, data needed to provide the user with a customized service, and/or the like), application data relating to the software tool that the user is accessing or attempting to access, and/or the like. In this case, the chatbot support platform may perform a search query (e.g., via a supplemental data API) to reference the one or more structures to obtain the particular entity data. For example, the chatbot support platform may use the service identifier and/or entity identifiers for the second set of entities to search the one or more data structures, which may store a corresponding service identifier and/or one or more corresponding entity identifiers in association with the particular entity data. This may cause the particular entity data to be provided to the chatbot support platform (e.g., via the supplemental data API).

In the example shown, the chatbot support platform may determine that priority data and/or account data for the user was not provided by the user in the request to the chatbot. In this example, the chatbot support platform may perform a search query that uses an identifier for the priority data and/or identifiers for one or more types of account data to reference a data structure (e.g., a database) to obtain the priority data and/or the account data. Specifically, the priority data may specify that a request to reset a password is a high-priority service and may provide any account data relating to the user that may be needed to perform a password reset procedure (e.g., an electronic mail (e-mail) address of the user, a username of the user, information needed to perform a successful authentication of the user, and/or the like).

In this way, the chatbot support platform identifies the service requested by the user and obtains entity data (e.g., the first set of entity data and/or the second set of entity data) that is needed in order to provide the user with the requested service.

Figure 1C:
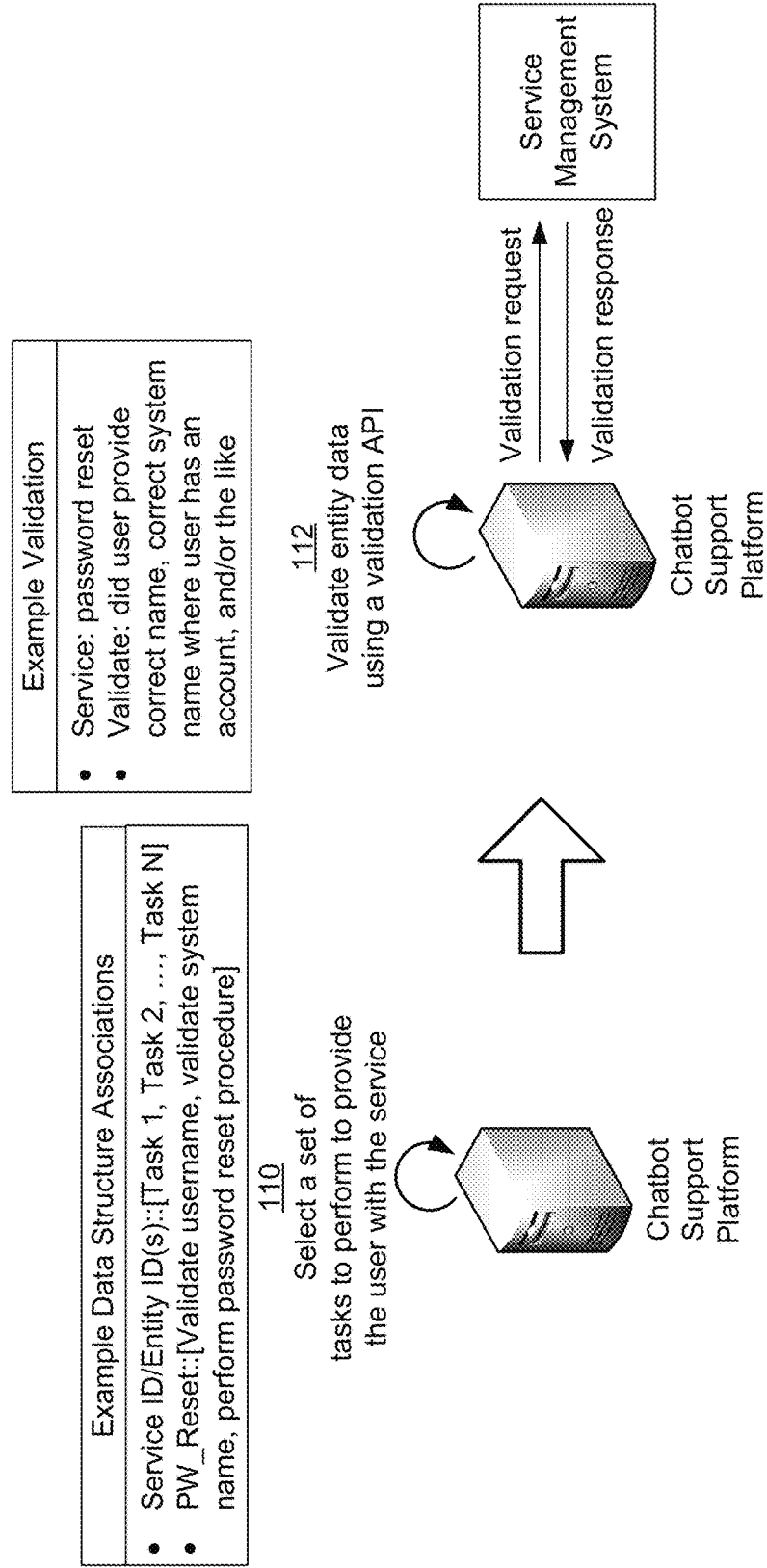

As shown in FIG. 1C, and by reference number 110, the chatbot support platform may select a set of tasks to perform in order to provide the user with the service. For example, the chatbot support platform may select a set of tasks to perform based on the service identifier, based on the first set of entity data, based on the second set of entity data, and/or the like. In some implementations, the chatbot support platform may have access to a data structure that associates task data for tasks that may be performed with particular service identifiers and/or entity identifiers. For example, the chatbot support platform may use the service identifier for the identified service and/or entity identifiers for entities included in the first set of entities and/or the second set of entities to reference the data structure. The data structure may be used to store a corresponding service identifier and/or corresponding entity identifiers in association with task data for the set of tasks that are to be performed.

The task data may include task identifiers for the set of tasks, instructions specifying how to perform the set of tasks, and/or the like. The set of tasks may include a task to validate particular entity data, one or more tasks that provide the user with the requested service, and/or the like. The set of tasks may be performed by the chatbot support platform, by one or more components of the service management system (e.g., via one or more service performance APIs), and/or the like.

In the example shown, the chatbot support platform may use the service identifier for the identified service to reference the data structure. The data structure may be used to store a corresponding service identifier (shown as PW_Reset) in association with a first task to validate the username, a second task to validate the system name, and a third task to initiate a password reset procedure. Referencing the data structure may cause task data for each respective task to be provided to the chatbot support platform. In this example, the first two tasks may be to validate that the user provided the appropriate information and the third task may be to interact with the service management system to initiate the password reset procedure.

As shown by reference number 112, the chatbot support platform may validate entity data using a validation API. For example, the task data may include a set of instructions indicating to use a validation API to interact with a component of the service management system to validate particular entity data. This may cause the chatbot support platform to provide (e.g., via the validation API) a validation request to the component of the service management system. The validation request may include the particular entity data that is to be validated. This may cause the component of the service management system to provide (e.g., via the validation API) the chatbot support platform with a validation response that indicates whether the particular entity data has been validated.

If the validation is successful, the chatbot support platform may perform one or more other tasks needed to provide the user with the service (e.g., as described in connection with FIG. 1D). If the validation is unsuccessful, the chatbot support platform may cause the chatbot to alert the user that the particular entity data was unable to be validated. This may allow the user to interact with the chatbot to provide new entity data (e.g., in case the particular entity data that had been previously provided was incorrect, included a typographical error, and/or the like), to connect the user with a help desk support team, and/or the like.

In the example shown, the chatbot support platform may use the validation API to validate the first set of entity data (and/or the second set of entity data). In this example, a cloud storage system (e.g., SharePoint, and/or the like) of the service management system may store profile data for users that have accounts with the software tool that the user had been attempting to access. Additionally, the chatbot support platform may provide a validation request to the cloud storage system. The validation request may include entity data that identifies the user and/or the software tool. This may cause the cloud storage system to validate the entity data (e.g., by confirming that the identifier provided by the user matches with an identifier of a registered user, by confirming that the user has an account with the software tool or a larger system that provides access to the software tool, and/or the like) and to provide the chatbot support platform with a validation response indicating whether the entity data has been validated.

As another example, the chatbot support platform may need to validate bank account information provided by the user (e.g., as part of a request for a particular banking service). In this example, the chatbot support platform may use a validation API to provide a bank server with a validation request to validate the bank account information provided by the user. This may cause the bank server to validate the bank account information and to provide the chatbot support platform with a validation response indicating whether the bank account information has been validated.

In some implementations, the chatbot support platform may use a data structure to store all (or some) operations performed by the user. For example, the chatbot support platform may use a data structure to store user action data that specify interactions that the user has made with the chatbot (further described in connection with FIG. 1D), interactions that the user has made with one or more components of the service management system, and/or the like. The user action data may be used by one or more data models that use machine learning to recommend services to users (e.g., as further described in connection with FIG. 1D).

In this way, the chatbot support platform selects tasks to perform and validates entity data provided by the user. This conserves resources (e.g., processing resources, network resources, and/or the like) relative to performing one or more post-validation tasks with invalid data (e.g., resources may be wasted attempting to initiate a password reset procedure with an invalid username, with a correct username but with an incorrect system, and/or the like).

Figure 1D:
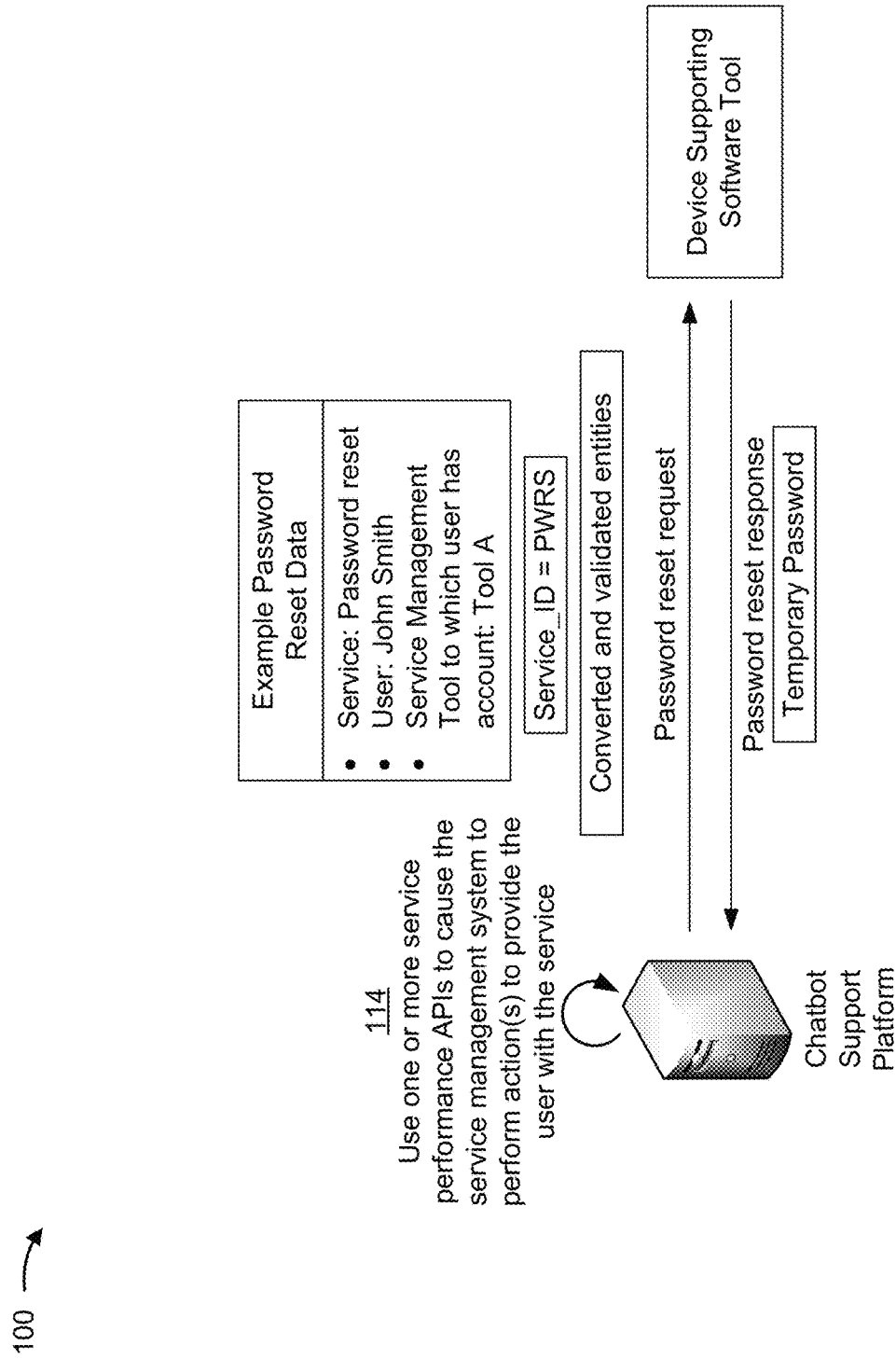

As shown in FIG. 1D, and by reference number 114, the chatbot support platform may use one or more service performance APIs to cause the service management system to perform one or more actions to provide the user with the service. For example, the chatbot support platform may perform a remainder of the selected set of tasks, which may involve using one or more service performance APIs to instruct one or more components of the service management system to perform one or more actions to provide the user with the service.

In the example shown, the chatbot support platform may initiate a password reset procedure with a device that supports the software tool. In this example, the chatbot support platform may initiate a password reset procedure by using a service performance API to visit an interface (e.g., a web interface, and/or the like) that allows the user to log in to the software tool. Additionally, the chatbot support platform may use robotic process automation (RPA) or a similar technique to execute a set of instructions that initiate the password reset procedure. This may cause a password reset request to be provided to a device that supports the software tool, which may allow the device to perform a password reset procedure to reset the user's password.

Furthermore, the device supporting the software tool may provide a password reset response to the chatbot support platform and/or to an account (e.g., an e-mail account, and/or the like) of the user. In some implementations, the chatbot support platform may notify the user that the password has been reset (e.g., via the chatbot, via an e-mail, and/or the like). For example, the chatbot support platform may use an e-mail adaptor API to provide an e-mail account of the user with a notification that the password has been reset. In this case, the chatbot support platform may have configurable e-mail templates that may be populated with information specific to the user's request. In other cases, the device that supports the software tool may notify the user that the password has been reset.

As another example, the chatbot support platform may initiate an approval procedure to grant a particular user with permissions to access particular data. In this example, the chatbot support platform may initiate the approval procedure by providing (e.g., via a service performance API), to a device that stores user permissions data for users of the organization, a set of instructions to modify permissions for the particular user based on specified user permissions data included in the request. This may cause the device that stores the user permissions data to update fields of a data structure (e.g., a table storing the user permissions data) to update the permissions for the particular user. Additionally, the device may provide (e.g., via the service performance API), to the chatbot support platform, an indication of whether the permissions for the particular user have been modified.

In this way, the chatbot support platform uses the one or more service performance APIs to cause one or more components of the service management system to perform one or more actions to provide the user with the service.

In some implementations, the chatbot support platform may provide the user with a service based on a recommendation driven by machine learning. For example, the chatbot support platform may have access to a recommendation model that has been trained using machine learning to recommend a service to the user. The service that may be recommended to the user may include an operation that the user is being recommended to perform, data that the user may utilize to perform an operation, an analytics report relating to a task or operation that the user is performing (e.g., which may include business analytics, application analytics, and/or the like), a service offered by the chatbot, and/or the like.

In some implementations, the recommendation model may be hosted on another platform. For example, the recommendation model may be hosted by another platform and the chatbot support platform may use a recommended service API to request a recommended service from the recommendation model. In this case, the recommendation model may have been trained to recommend a service based on trends that were identified while using one or more machine learning techniques to analyze historical user action data. The historical user action data may identify interactions that users have made with particular systems and/or software tools associated with the service management system. For example, the historical user action data may identify interactions that users have made with the chatbot, with particular systems within the service management system, with particular software tools associated with the service management system, and/or the like.

Additionally, the recommendation model may be provided with user action data that has been indexed from multiple data sources. For example, to provide real-time (or near real-time) recommendations, the recommendation model may be periodically provided with user action data from multiple data sources. As such, when the chatbot support platform uses the recommended service API to request a recommended service, the other platform may provide, as input to the recommendation model, user action data for a specified user, historical user action data for the specified user, a set of features associated with the user action data, and/or the like, which may cause the recommendation model to output a set of recommended service scores. In this case, the other platform may select a service based on the set of recommended service scores and may use the recommended service API to provide data identifying the recommended service to the chatbot support platform. This may allow the chatbot support platform to provide the user with the selected service.

In some implementations, the chatbot support platform may provide the user with a recommended service based on receiving the request made by the user. Additionally, or alternatively, the chatbot support platform may provide the user with a recommended service without having the user interact with the chatbot. For example, while the user is accessing the software tool, user action data identifying one or more interactions that the user has with the software tool may be provided to the chatbot support platform. This may allow the chatbot support platform to obtain a recommended service from the recommendation model and to provide the user with the recommended service (e.g., via an interface of the chatbot, an interface of the software tool, via an e-mail address of the user, and/or the like).

In some implementations, the chatbot support platform may receive a trained recommendation model from another device. For example, the recommendation model may be trained on a device associated with a software developer and provided to the chatbot support platform. In some implementations, the chatbot support platform may train the recommendation model. For example, the chatbot support platform may train the recommendation model on the historical user action data using one or more machine learning techniques (defined elsewhere herein). In this case, the chatbot support platform may determine a set of features that serve as indicators of a likelihood of a user needing a recommended service (e.g., based on a particular user action occurring, based on a sequence of user actions occurring, and/or the like).

As an example, the chatbot support platform may receive user action data indicating that the user has incorrectly input a password needed to log in to the software tool. In this example, the chatbot support platform may provide the user action data as input to the recommendation model to cause the recommendation model to output a set of recommended service scores. This may allow the chatbot support platform to select a password reset service based on the set of recommended service scores and to provide the user with a recommendation to use the password reset service (e.g., via the interface of the chatbot or another type of interface described herein).

As another example, the chatbot support platform may receive user action data indicating that the user has performed a sequence of operations that are often performed prior to generating an analytics report. In this example, the chatbot support platform may provide the user action data as input to the recommendation model to cause the recommendation model to output a set of recommended service scores. This may allow the chatbot support platform to select an analytics report generation service based on the set of recommended service scores and to provide the user with a recommendation to generate the analytics report (e.g., via the interface of the chatbot or another type of interface described herein).

In this way, the chatbot support platform can recommend services to the user, even without the user interacting with the chatbot. This conserves resources (e.g., processing resources, network resources, and/or the like) by providing the user with the recommended service without the user needing to submit a request to the chatbot, conserves resources by pre-emptively avoiding issues that would have been caused without the recommended service, and/or the like.

As indicated above, FIGS. 1A-1D are provided as one or more examples. Other examples may differ from what is described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
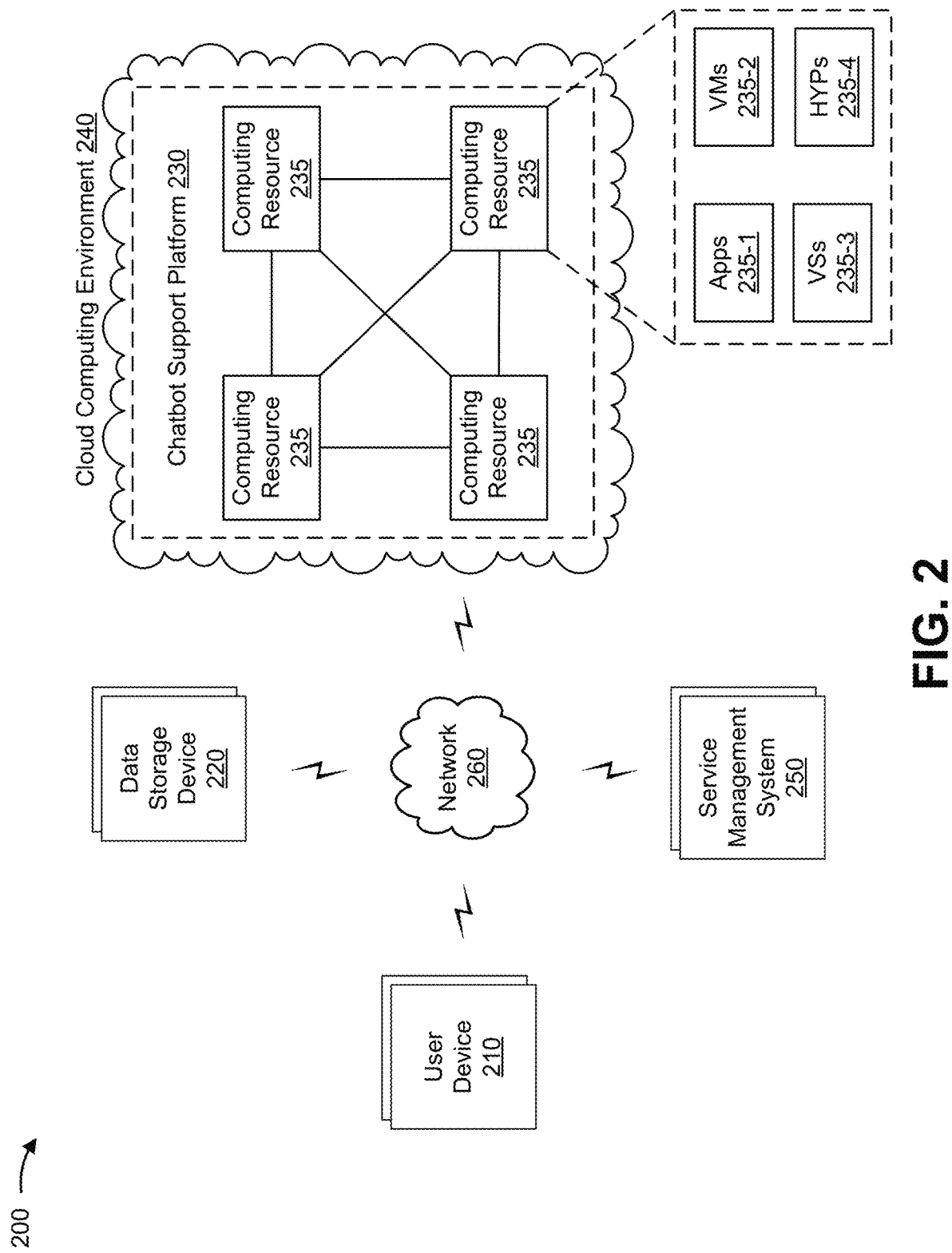
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a data storage device 220, a chatbot support platform 230 hosted within a cloud computing environment 240, and a service management system 250. Devices of environment 200 may interconnect via wired connections, wireless connections, or a combination of wired and wireless connections.

User device 210 includes one or more devices capable of receiving, generating, storing, processing, and/or providing information associated with a chatbot. For example, user device 210 may include a device or machine, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device or machine. In some implementations, user device 210 may provide a request for a service to chatbot support platform 230, may receive information relating to the service from chatbot support platform 230 and/or service management system 250, and/or the like.

Data storage device 220 includes one or more devices capable of receiving, storing, generating, determining, and/or providing information associated with a chatbot and/or service management system 250. For example, data storage device 220 may include a server device or a group of server devices. In some implementations, data storage device 220 may store request data associated with requests made by users, response data associated with responses provided to the users based on the request data, user action data associated with interactions that users have made with the chatbot and/or service management system 250, and/or the like. In some implementations, the data stored by data storage device 220 may be stored by chatbot support platform 230.

Chatbot support platform 230 includes one or more devices capable of receiving, storing, generating, determining, and/or providing information associated with a chatbot and/or a service management system. For example, chatbot support platform 230 may include a server device (e.g., a host server, a web server, an application server, etc.), a data center device, or a similar device. In some implementations, chatbot support platform 230 may interact with service management system 250 to provide a user with a service, as described in detail elsewhere herein.

In some implementations, chatbot support platform 230 may have access to a set of application programming interfaces (APIs) that may be used to interact with service management system 250. The set of APIs may include a request service API, an identify service API, one or more supplemental data APIs, a validation API, one or more service performance APIs, a recommended service API, an electronic mail (e-mail) adaptor API, and/or the like. The set of APIs may include open APIs, partner APIs, internal APIs, composite APIs, and/or the like. Additionally, the set of APIs may utilize representational state transfer (REST) technology, a simple object access protocol (SOAP) protocol, and/or the like.

In some implementations, chatbot support platform 230 may host and/or support a click event handler that identifies a user click event and notifies the chatbot. In some cases, a customized chat window interface may be implemented for handling mouse click events made by the user. In some implementations, chatbot support platform 230 may host and/or support a dialogue context manager that may be used to obtain the second set of entity data. In some implementations, chatbot support platform 230 may host and/or support a configuration data manager that uses a configuration API to maintain configuration data for one or more systems within service management system 250. For example, if a configuration is unable to be maintained in a configuration file, the configuration may be maintained in a site list of a cloud service provider. The configuration API may be one of the supplemental data APIs and/or service performance APIs described elsewhere herein. In some implementations, chatbot support platform 230 may host and/or support a machine learning engine and/or a natural language processing engine, as described elsewhere herein.

In some implementations, as shown, chatbot support platform 230 may be hosted in cloud computing environment 240. While implementations described herein describe chatbot support platform 230 as being hosted in cloud computing environment 240, in some implementations, chatbot support platform 230 might not be cloud-based (i.e., may be implemented outside of a cloud computing environment) or may be partially cloud-based.

Cloud computing environment 240 includes an environment that hosts chatbot support platform 230. Cloud computing environment 240 may provide computation, software, data access, storage, etc. services that do not require end-user knowledge of a physical location and configuration of system(s) and/or device(s) that hosts chatbot support platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host chatbot support platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or data storage device 220. Application 235-1 may eliminate a need to install and execute the software applications on these devices. For example, application 235-1 may include software associated with chatbot support platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Service management system 250 includes one or more devices capable of receiving, storing, generating, processing, and/or providing information associated with a chatbot. For example, service management system 250 includes a service device or a group of server devices, a desktop computer, a laptop computer, a storage device, and/or a similar type of device.

In some implementations, service management system 250 may include a collection of systems that support a set of software tools that are used by one or more organizations. For example, the service management system may include a Systems Applications and Products (SAP) system, an enterprise resource planning (ERP) system, a customer-relationship management (CRM) system, a content management system (CMS), an application management support (AMS) system, and/or any other similar type of system (e.g., an open system that utilizes interoperability, portability, open source standards, and/or the like). One or more of the systems may be supported by cloud service providers, on-site servers, data storage devices, and/or the like. As used herein, a component of service management system 250 may refer to a system within service management system 250, a software tool associated with service management system 250, a data storage device associated with service management system 250, a platform of a cloud service provider that is supporting service management system 250, and/or the like.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
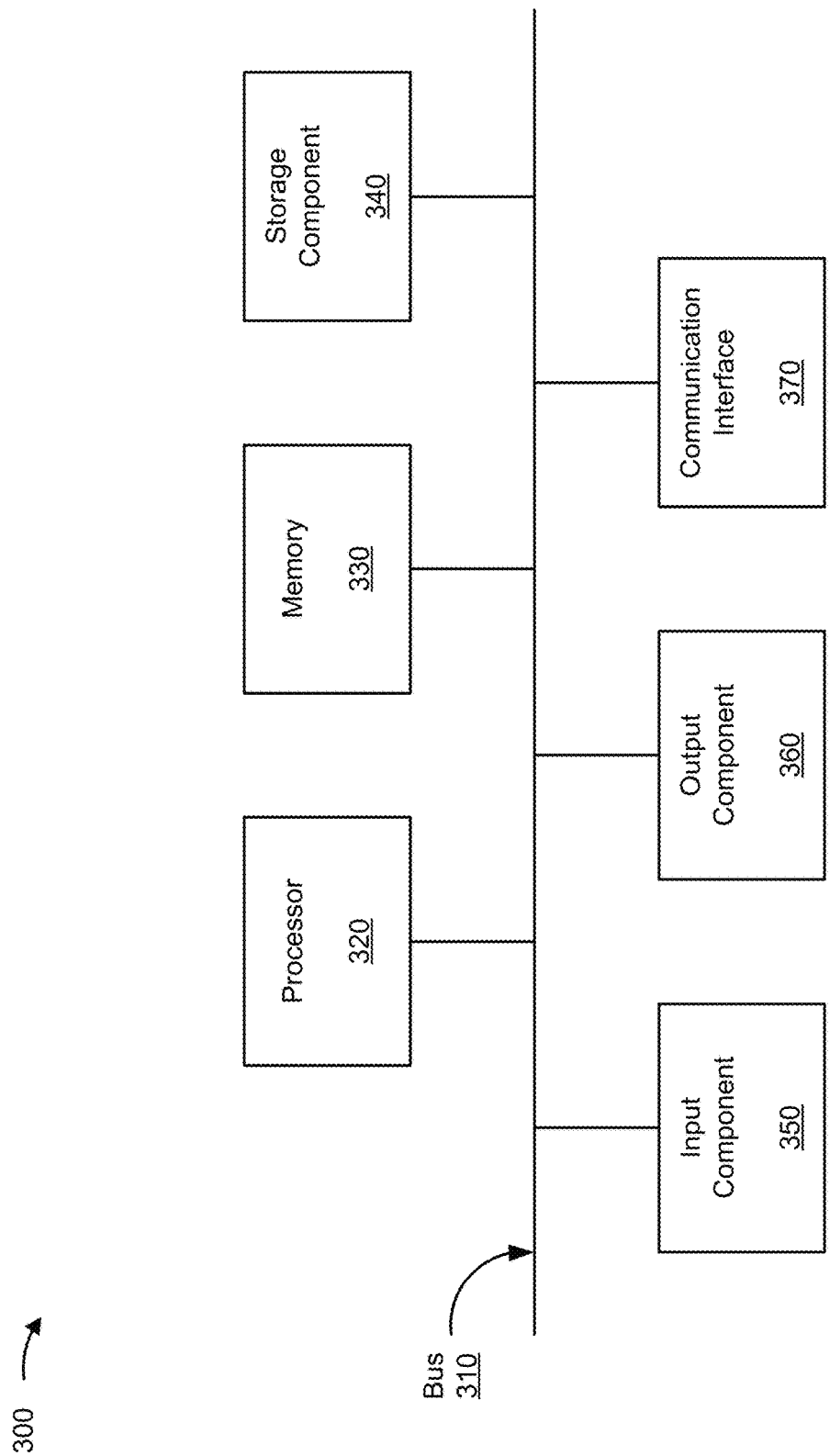
FIG. 3 is a diagram of example components of one or more devices of FIG. 3.

FIG. 3 is a diagram of example components of a device 300. Device 300 may correspond to user device 210, data storage device 220, chatbot support platform 230, and/or service management system 250. In some implementations, user device 210, data storage device 220, chatbot support platform 230, and/or service management system 250 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., a camera, an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
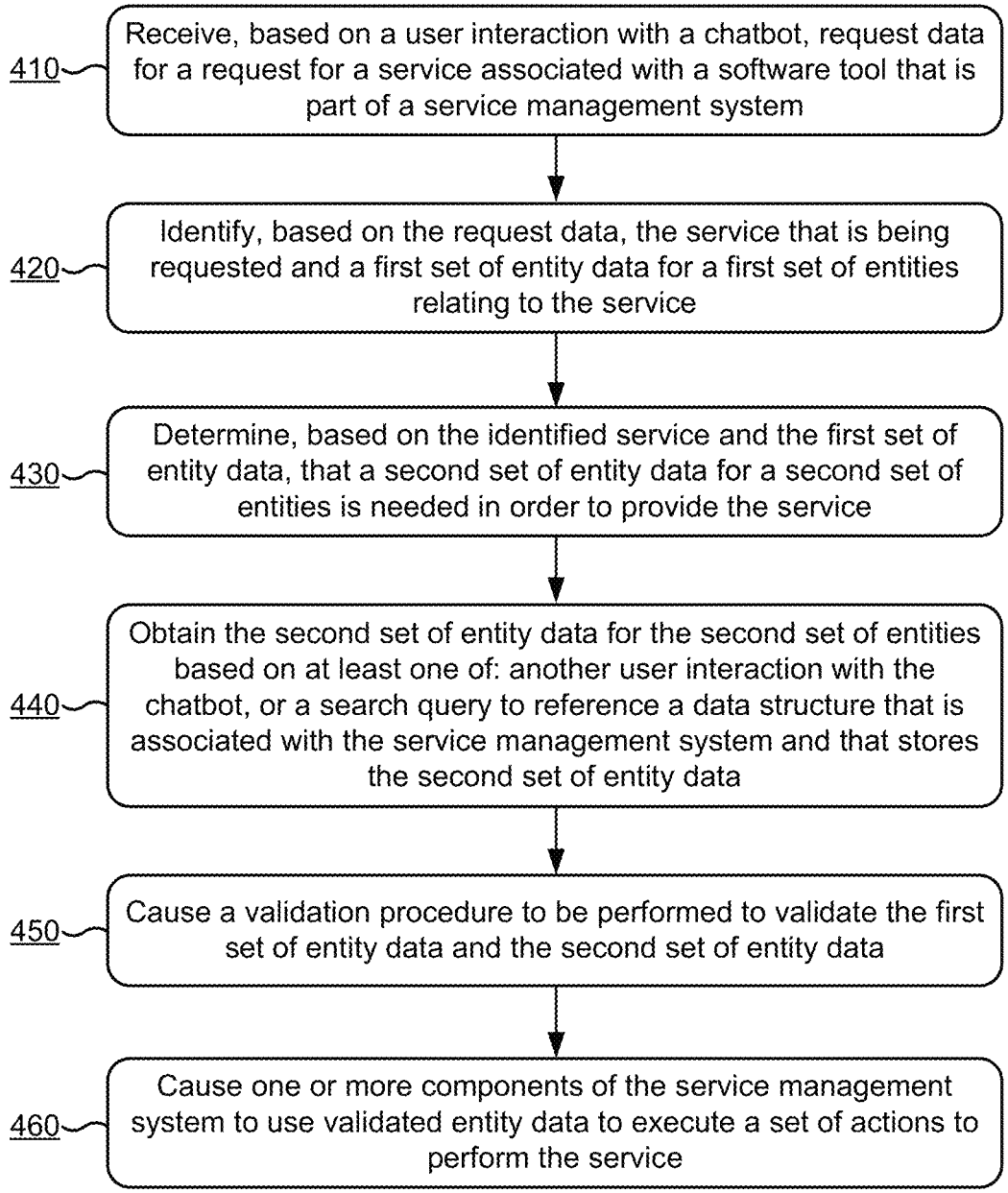
FIGS. 4-6 are flowcharts of one or more example processes for using a chatbot driven by machine learning to provide a service to a user that is interacting with a service management system.

FIG. 4 is a flow chart of an example process 400 for using a chatbot driven by machine learning to provide a service to a user that is interacting with a service management system. In some implementations, one or more process blocks of FIG. 4 may be performed by a chatbot support platform (e.g., chatbot support platform 230). In some implementations, one or more process blocks of FIG. 4 may be performed by another device or a group of devices separate from or including the chatbot support platform, such as a user device (e.g., user device 210, a data storage device (e.g., data storage device 220), a service management system (e.g., service management system 250), and/or the like.

As shown in FIG. 4, process 400 may include receiving, based on a user interaction with a chatbot, request data for a request for a service associated with a software tool that is part of a service management system (block 410). For example, the chatbot support platform (e.g., using computing resource 235, processor 320, memory 330, storage component 340, input component 350, communication interface 370, and/or the like) may receive, based on a user interaction with a chatbot, request data for a request for a service associated with a software tool that is part of a service management system, as described above.

As further shown in FIG. 4, process 400 may include identifying, based on the request data, the service that is being requested and a first set of entity data for a first set of entities relating to the service (block 420). For example, the chatbot support platform (e.g., using computing resource 235, processor 320, memory 330, storage component 340, input component 350, output component 360, communication interface 370, and/or the like) may identify, based on the request data, the service that is being requested and a first set of entity data for a first set of entities relating to the service, as described above.

As further shown in FIG. 4, process 400 may include determining, based on the service identifier and the first set of entity data, that a second set of entity data for a second set of entities is needed in order to provide the service (block 430). For example, the chatbot support platform (e.g., using computing resource 235, processor 320, memory 330, storage component 340, input component 350, output component 360, communication interface 370, and/or the like) may determine, based on the service identifier and the first set of entity data, that a second set of entity data for a second set of entities is needed in order to provide the service, as described above.

As further shown in FIG. 4, process 400 may include obtaining the second set of entity data for the second set of entities based on at least one of: another user interaction with the chatbot, or a search query to reference a data structure that is associated with the service management system and that stores the second set of entity data (block 440). For example, the chatbot support platform (e.g., using computing resource 235, processor 320, memory 330, storage component 340, input component 350, output component 360, communication interface 370, and/or the like) may obtain the second set of entity data for the second set of entities based on at least one of: another user interaction with the chatbot, or a search query to reference a data structure that is associated with the service management system and that stores the second set of entity data, as described above.

As further shown in FIG. 4, process 400 may include causing a validation procedure to be performed to validate the first set of entity data or the second set of entity data (block 450). For example, the chatbot support platform (e.g., using computing resource 235, processor 320, memory 330, storage component 340, input component 350, output component 360, communication interface 370, and/or the like) may cause a validation procedure to be performed to validate the first set of entity data or the second set of entity data, as described above.

As further shown in FIG. 4, process 400 may include causing one or more components of the service management system to use validated entity data to execute a set of actions to perform the service (block 460). For example, the chatbot support platform (e.g., using computing resource 235, processor 320, memory 330, storage component 340, input component 350, output component 360, communication interface 370, and/or the like) may cause one or more components of the service management system to use validated entity data to execute a set of actions to perform the service, as described above.

Process 400 may include additional implementations, such as any single implementation or any combination of implementations described below and/or in connection with one or more other processes described elsewhere herein.

In some implementations, when identifying the service identifier and the first set of entity data, the chatbot support platform may process terms included in the request using a data model that has been trained using machine learning to generate a set of service scores that indicate likelihoods of particular terms identifying particular services that are part of a set of available services. Additionally, the chatbot support platform may select the service identifier, from a list of service identifiers for the set of available services, based on the set of service scores, and may process the terms included in the request using one or more natural language processing techniques to identify the first set of entity data for the first set of entities relating to the service.

In some implementations, when causing the validation procedure to be performed, the chatbot support platform may select, based on the service identifier, an application programming interface (API) that is to be used to validate a subset of the first set of entity data for an entity included in the first set of entities, and may provide, via the particular API, a validation request to another device to cause the other device to provide the device with a validation response that indicates whether the subset of the first set of entity data has been validated.

In some implementations, when obtaining the second set of entity data, the chatbot support platform may cause the chatbot to display a follow-up question via a chatbot interface. In some implementations, the chatbot support platform may receive, from a user device associated with the user (e.g., user device 210), response data that includes a subset of the second set of entity data for at least one of the second set of entities.

In some implementations the chatbot support platform may standardize a format of at least one of: the first set of entity data, or the second set of entity data, by referencing a data structure.

In some implementations, the chatbot support platform may receive user action data that describes one or more operations performed by the user while accessing the software tool. In some implementations, the chatbot support platform may provide the user action data as input to an application programming interface (API) to cause a data model that has been trained using machine learning to process the user action data to generate a set of recommended service scores for a set of available services. In some implementations, the chatbot support platform may generate recommendation data for a recommendation to provide the user with another service based on the set of recommended service scores. In some implementations, the chatbot support platform may cause the recommendation to be provided to an interface accessible to the user.

In some implementations, the chatbot support platform may receive feedback data from a particular user that has identified at least one false positive in the first set of entity data. In some implementations, the chatbot support platform may retrain a data model that is used to identify the first set of entities based on the feedback data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
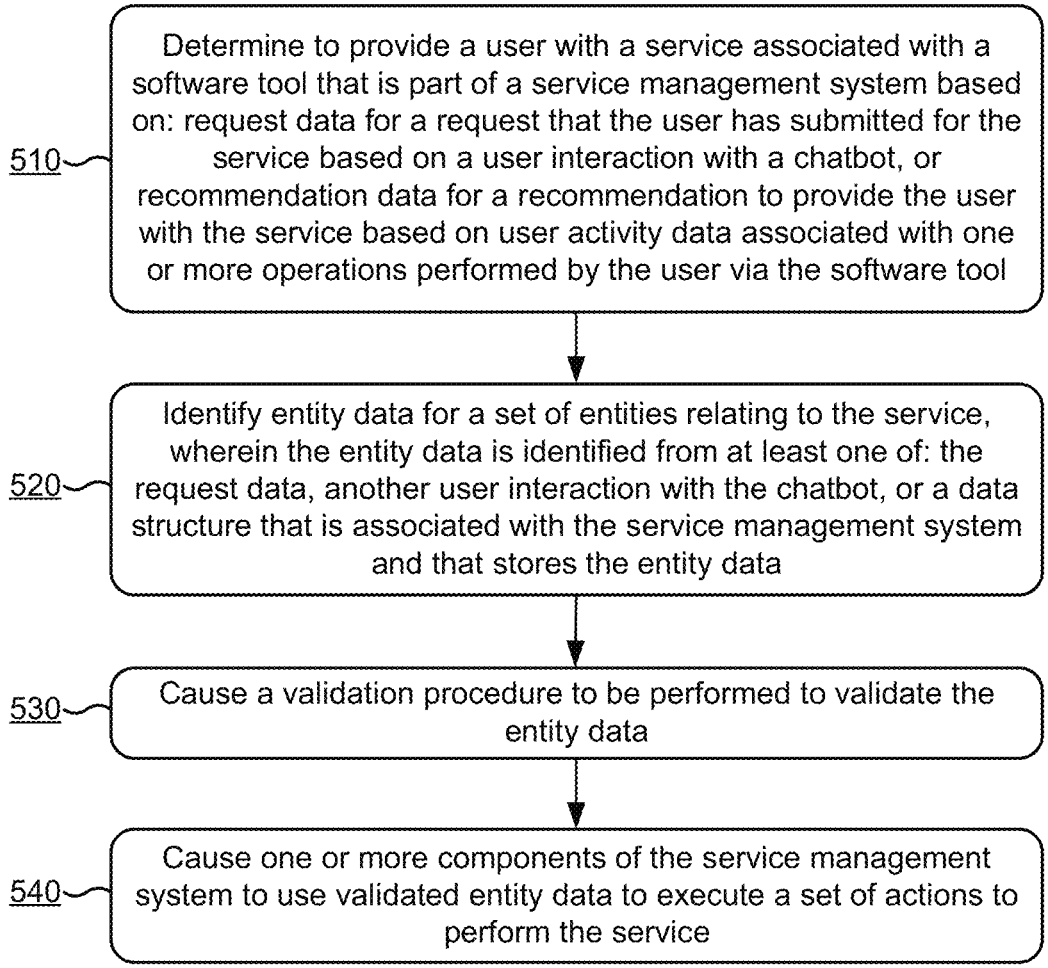

FIG. 5 is a flow chart of an example process 500 for using a chatbot driven by machine learning to provide a service to a user that is interacting with a service management system. In some implementations, one or more process blocks of FIG. 5 may be performed by a chatbot support platform (e.g., chatbot support platform 230). In some implementations, one or more process blocks of FIG. 5 may be performed by another device or a group of devices separate from or including the chatbot support platform, such as a user device (e.g., user device 210, a data storage device (e.g., data storage device 220), a service management system (e.g., service management system 250), and/or the like.

As shown in FIG. 5, process 500 may include determining to provide a user with a service associated with a software tool that is part of a service management system based on request data for a request that the user has submitted for the service based on a user interaction with a chatbot, or based on recommendation data for a recommendation to provide the user with the service based on user activity data associated with one or more operations performed by the user via the software tool (block 510). For example, the chatbot support platform (e.g., using computing resource 235, processor 320, memory 330, storage component 340, input component 350, output component 360, communication interface 370, and/or the like) may determine to provide a user with a service associated with a software tool that is part of a service management system based on request data for a request that the user has submitted for the service based on a user interaction with a chatbot, or based on recommendation data for a recommendation to provide the user with the service based on user activity data associated with one or more operations performed by the user via the software tool, as described above.

As further shown in FIG. 5, process 500 may include identifying entity data for a set of entities relating to the service, wherein the entity data is identified from at least one of: the request data, a user interaction with the chatbot, or a data structure that is associated with the service management system and that stores the entity data (block 520). For example, the chatbot support platform (e.g., using computing resource 235, processor 320, memory 330, storage component 340, input component 350, output component 360, communication interface 370, and/or the like) may identify entity data for a set of entities relating to the service, as described above. In some implementations, the entity data may be identified from at least one of: the request data, a user interaction with the chatbot, or a data structure that is associated with the service management system and that stores the entity data.

As further shown in FIG. 5, process 500 may include causing a validation procedure to be performed to validate the entity data (block 530). For example, the chatbot support platform (e.g., using computing resource 235, processor 320, memory 330, storage component 340, input component 350, output component 360, communication interface 370, and/or the like) may cause a validation procedure to be performed to validate the entity data, as described above.

As further shown in FIG. 5, process 500 may include causing one or more components of the service management system to use validated entity data to execute a set of actions to perform the service (block 540). For example, the chatbot support platform (e.g., using computing resource 235, processor 320, memory 330, storage component 340, input component 350, output component 360, communication interface 370, and/or the like) may cause one or more components of the service management system to use validated entity data to execute a set of actions to perform the service, as described above.

Process 500 may include additional implementations, such as any single implementation or any combination of implementations described below and/or in connection with one or more other processes described elsewhere herein.

In some implementations, when determining to provide the user with the service, the chatbot support platform may determine to provide the user with the service based on receiving the request data. In some implementations, the request data may include a service identifier for the service that is being requested. In some implementations, when identifying the entity data, the chatbot support platform may identify a first set of entity data for a first subset of entities, of the set of entities relating to the service, by processing the request data. In some implementations, the chatbot support platform may identify a second set of entity data for a second subset of entities, of the set of entities relating to the service, by instructing the chatbot to display an entity request message to the user via a chatbot interface to permit an entity response message that includes the second set of entity data to be provided to the device.

In some implementations, the chatbot support platform may determine to provide the user with the service based on receiving the request data. In some implementations, the request data may include a service identifier for the service that is being requested. In some implementations, the chatbot support platform may identify a first set of entity data for a first subset of entities, of the set of entities relating to the service, by processing the request data. In some implementations, the chatbot support platform may identify a second set of entity data for a second subset of entities, of the set of entities relating to the service, by performing a search query to reference the data structure associated with the service management system to cause a search response that includes the second set of entity data to be provided to the device.

In some implementations, when determining to provide the user with the service, the chatbot support platform may receive user activity data that describes one or more operations performed by the user while accessing the software tool. In some implementations, the chatbot support platform may provide the user activity data as input to a data model that has been trained using machine learning to cause the data model to output a set of recommended service scores that indicate likelihoods of particular services being appropriate services to recommend to the user. In some implementations, the chatbot support platform may generate the recommendation data based on the set of recommended service scores. In some implementations, the chatbot support platform may determine to provide the user with the service based on the recommendation data.

In some implementations, the set of entities may include at least one of: an identifier of the user, an identifier of the software tool, an identifier of the service management system, an identifier of a role that the user has within an organization, an identifier of an operation that is capable of being performed as part of the role, or an identifier of a priority level of the service requested by the user.

In some implementations, when causing the validation procedure to be performed, the chatbot support platform may identify, based on a service identifier for the service, a subset of entities, of the set of entities, that are to be validated. In some implementations, the chatbot support platform may select, based on the service identifier for the service, an application programming interface (API) that is to be used to validate particular entity data for one or more entities of the set of entities. In some implementations, the chatbot support platform may provide, via the API, a validation request to another device to cause the other device to provide the device with a validation response that indicates whether the particular entity data has been validated.

In some implementations, the chatbot support platform may select, based on a service identifier for the service, an application programming interface (API) that is to be used to cause the one or more components of the service management system to execute the set of actions to perform the service. In some implementations, when causing the one or more components of the service management system to perform the set of actions to provide the service, the chatbot support platform may provide the validated entity data to the one or more components of the service management system via the API to cause the one or more components to execute the set of actions to perform the service.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
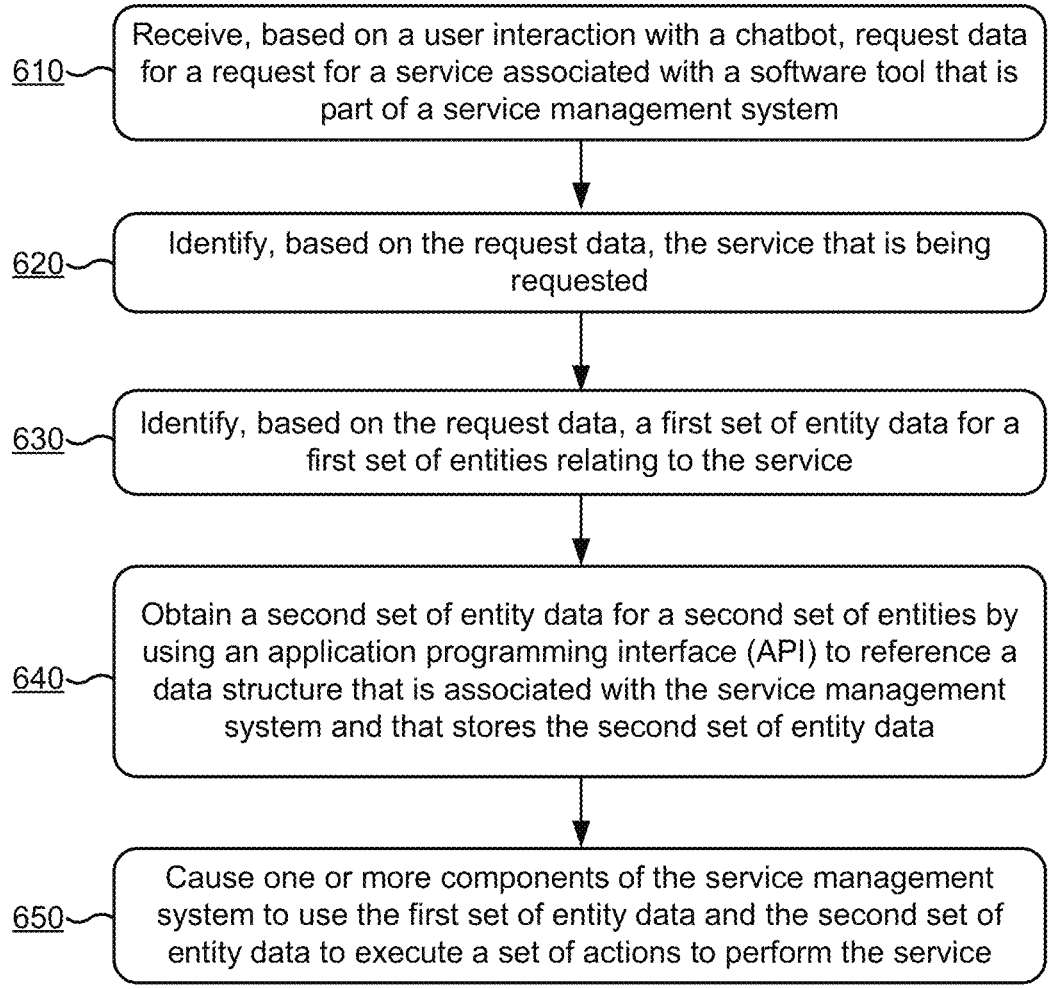

FIG. 6 is a flow chart of an example process 600 for using a chatbot driven by machine learning to provide a service to a user that is interacting with a service management system. In some implementations, one or more process blocks of FIG. 6 may be performed by a chatbot support platform (e.g., chatbot support platform 230). In some implementations, one or more process blocks of FIG. 6 may be performed by another device or a group of devices separate from or including the chatbot support platform, such as a user device (e.g., user device 210, a data storage device (e.g., data storage device 220), a service management system (e.g., service management system 250), and/or the like.

As shown in FIG. 6, process 600 may include receiving, based on a user interaction with a chatbot, request data for a request for a service associated with a software tool that is part of a service management system (block 610). For example, the chatbot support platform (e.g., using computing resource 235, processor 320, memory 330, storage component 340, input component 350, output component 360, communication interface 370, and/or the like) may receive, based on a user interaction with a chatbot, request data for a request for a service associated with a software tool that is part of a service management system, as described above.

As further shown in FIG. 6, process 600 may include identifying, based on the request data, the service that is being requested (block 620). For example, the chatbot support platform (e.g., using computing resource 235, processor 320, memory 330, storage component 340, input component 350, output component 360, communication interface 370, and/or the like) may identify, based on the request data, the service that is being requested, as described above.

As further shown in FIG. 6, process 600 may include identifying, based on the request data, a first set of entity data for a first set of entities relating to the service (block 630). For example, the chatbot support platform (e.g., using computing resource 235, processor 320, memory 330, storage component 340, input component 350, output component 360, communication interface 370, and/or the like) may identify, based on the request data, a first set of entity data for a first set of entities relating to the service, as described above.

As further shown in FIG. 6, process 600 may include obtaining a second set of entity data for a second set of entities by using an application programming interface (API) to reference a data structure that is associated with the service management system and that stores the second set of entity data (block 640). For example, the chatbot support platform (e.g., using computing resource 235, processor 320, memory 330, storage component 340, input component 350, output component 360, communication interface 370, and/or the like) may obtain a second set of entity data for a second set of entities by using an application programming interface (API) to reference a data structure that is associated with the service management system and that stores the second set of entity data, as described above.

As further shown in FIG. 6, process 600 may include causing one or more components of the service management system to use the first set of entity data and the second set of entity data to execute a set of actions to perform the service (block 650). For example, the chatbot support platform (e.g., using computing resource 235, processor 320, memory 330, storage component 340, input component 350, output component 360, communication interface 370, and/or the like) may cause one or more components of the service management system to use the first set of entity data and the second set of entity data to execute a set of actions to perform the service, as described above.

Process 600 may include additional implementations, such as any single implementation or any combination of implementations described below and/or in connection with one or more other processes described elsewhere herein.

In some implementations, the first set of entity data and the second set of entity data may be referred to collectively as a third set of entity data. In some implementations, the chatbot support platform may select, based on the service identifier for the service, a second API that is to be used to validate a subset of the third set of entity data. In some implementations, the chatbot support platform may provide, via the second API, a validation request to another device to cause the other device to provide the device with a validation response that indicates whether the subset of the third set of entity data has been validated.

In some implementations, when identifying the service that is being requested, the chatbot support platform may provide, via another API, the request data to a machine learning engine to cause the machine learning engine to execute a machine learning module to process the request data and to select the service identifier for the service, from a set of service identifiers for a set of available services. In some implementations, the chatbot support platform may receive the service identifier for the service via the other API. In some implementations, when identifying the first set of entity data, the chatbot support platform may provide, via the other API, the request data to a natural language processing engine to cause the natural language processing engine to process the request data to identify the first set of entity data for the first set of entities. In some implementations, the chatbot support platform may receive the first set of entity data via the other API.

In some implementations, the set of actions may include: receiving service data from a service management system using one or more application programming interfaces (APIs), generating response data based on the received service data, and causing the response data to be made available to another device or account associated with a user.

The service data may include data relating any service described in connection with FIGS. 1A-1D. For example, in FIG. 1D, the service data may include password reset data that includes a temporary password. The response data may include, for example, a message to a user that describes the service data, one or more recommendations for the user (e.g., a set of instructions for a user that specify one or more recommended user actions that may be performed, one or more additional services to recommended, and/or the like), and/or the like. In some implementations, the response data may include the service data.

In some implementations, the chatbot support platform may receive user action data that describes one or more operations performed by the user while accessing the software tool. In some implementations, the chatbot support platform may provide the user action data as input to an application programming interface (API) to cause a data model that has been trained using machine learning to process the user action data to generate a set of recommended service scores for a set of available services. In some implementations, the chatbot support platform may generate recommendation data for a recommendation to provide the user with another service based on the set of recommended service scores. In some implementations, the chatbot support platform may cause the recommendation to be provided to an interface accessible to the user.

In some implementations, the chatbot support platform may receive feedback data from a particular user that has identified at least one false positive in the first set of entity data. In some implementations, the chatbot support platform may retrain a data model that is used to identify the first set of entities based on the feedback data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, of a chat support platform, and based on a user interaction with a chatbot of the chat support platform, request data for a request for a service associated with a software tool that is part of a service management system, wherein the chat support platform is in communication with a plurality of application interfaces (APIs) that are each associated with one or more different functions associated with the service management system;
    identifying, by the device, a first API, of the plurality of APIs, based on:
        receiving the request data, and
        determining to identify:
            the service that is being requested, and
            a first set of entity data for a first set of entities relating to the service;
    using, by the device and based on the request data, the first API to identify the service that is being requested and the first set of entity data;
    determining, by the device and based on comparing the first set of entity data to a configured set of data associated with the service and stored in a data structure, that a second set of entity data for a second set of entities is needed in order to provide the service;
    obtaining, by the device, the second set of entity data for the second set of entities based on at least one of a plurality of configured options, for obtaining the second set of entity data, including:
        another user interaction with the chatbot, or
        a search query, via a particular API of the plurality of APIs, to reference a data structure that is associated with the service management system and that stores the second set of entity data;
    selecting, by the device and based on at least one of the first set of entity data or the second set of entity data, a set of tasks to perform in order to provide the service;
    identifying, by the device, a second API, of the plurality of APIs and different from the first API, based on:
        the set of tasks, and
        a determination to cause a validation procedure to be performed to validate the first set of entity data or the second set of entity data;
    using, by the device and based on at least one task of the set of tasks, the second API to cause the validation procedure to be performed to validate the first set of entity data or the second set of entity data; and
    causing, by the device and based on at least another task of the set of tasks, one or more components of the service management system to use validated entity data to execute a set of actions to perform the service.

2. The method of claim 1, wherein using the first API to identify the service and the first set of entity data comprises:
    processing terms included in the request using a data model that has been trained using machine learning to generate a set of service scores that indicate likelihoods of particular terms identifying particular services that are part of a set of available services,
    selecting a service identifier, from a list of service identifiers for the set of available services, based on the set of service scores, and
    processing the terms included in the request using one or more natural language processing techniques to identify the first set of entity data for the first set of entities relating to the service.

3. The method of claim 1, wherein using the second API to cause the validation procedure to be performed comprises:
    selecting, based on the identified service, the second API to be used to validate a subset of the first set of entity data for an entity included in the first set of entities, and
    providing, via the second API, a validation request to another device to cause the other device to provide the device with a validation response that indicates whether the subset of the first set of entity data has been validated.

4. The method of claim 1, wherein obtaining the second set of entity data comprises:
    causing the chatbot to display a follow-up question via a chatbot interface, and
    receiving, from a user device associated with a particular user, response data that includes a subset of the second set of entity data for at least one of the second set of entities wherein the response data comprises the other user interaction.

5. The method of claim 1, further comprising:
standardizing a format of at least one of the first set of entity data or the second set of entity data.

6. The method of claim 1, further comprising:
receiving user action data that describes one or more operations performed by a particular user while accessing the software tool;
providing the user action data as input to a third API, of the plurality of APIs, to cause a data model that has been trained using machine learning to process the user action data to generate a set of recommended service scores for a set of available services;
generating recommendation data for a recommendation to provide the user with another service based on the set of recommended service scores; and
causing the recommendation to be provided to an interface accessible to the user.

7. The method of claim 1, further comprising:
receiving feedback data from a particular user that has identified at least one false positive in the first set of entity data; and
retraining a data model that is used to identify the first set of entities based on the feedback data.

8. A device of a chat support platform in communication with a plurality of application interfaces (APIs) that are each associated with one or more different functions associated with a service management system, comprising:
one or more memories; and
one or more processors, coupled to the one or more memories, to:
determine to provide a user with a service, associated with a software tool that is part of the service management system, based on:
request data for a request that the user has submitted for the service based on a user interaction with a chatbot of the chat support platform, or
recommendation data for a recommendation to provide the user with the service based on user activity data associated with one or more operations performed by the user via the software tool;
identify a first API, of the plurality of APIs, based on:
a determination to provide the user with the service, and
a determination to identify entity data for a set of entities relating to the service;
use the first API to identify the entity data for the set of entities relating to the service,
wherein the entity data is identified from at least one of a plurality of configured options, for obtaining the entity data, including:
the request data,
another user interaction with the chatbot, or
a data structure that is associated with the service management system and that stores the entity data;
select, based on the entity data, a set of tasks to perform to provide the service;
identify a second API, of the plurality of APIs and different from the first API, based on:
the set of tasks, and
a determination to interact with a component, of one or more components of the service management system, to cause a validation procedure to be performed to validate the entity data;
use, based on at least one task of the set of tasks, the second API to interact with the component to cause the validation procedure to be performed to validate the entity data; and
cause, based on at least another task of the set of tasks, the one or more components of the service management system to use validated entity data to execute a set of actions to perform the service.

9. The device of claim 8, wherein the one or more processors, to determine to provide the user with the service, are to:
determine to provide the user with the service based on receiving the request data,
wherein the request data includes a service identifier for the service that is being requested; and
wherein the one or more processors, to use the first API to identify the entity data, are to:
identify a first set of entity data for a first subset of entities, of the set of entities relating to the service, by processing the request data, and
identify a second set of entity data for a second subset of entities, of the set of entities relating to the service, by instructing the chatbot to display an entity request message to the user via a chatbot interface to permit an entity response message that includes the second set of entity data to be provided to the device.

10. The device of claim 8, wherein the one or more processors, to determine to provide the user with the service, are to:
determine to provide the user with the service based on receiving the request data,
wherein the request data includes a service identifier for the service that is being requested; and
wherein the one or more processors, to use the first API to identify the entity data, are to:
identify a first set of entity data for a first subset of entities, of the set of entities relating to the service, by processing the request data, and
identify a second set of entity data for a second subset of entities, of the set of entities relating to the service, by performing a search query, via a particular API of the plurality of APIs, to reference the data structure associated with the service management system to cause a search response that includes the second set of entity data to be provided to the device.

11. The device of claim 8, wherein the one or more processors, to determine to provide the user with the service, are to:
receive user activity data that describes one or more operations performed by the user while accessing the software tool,
provide the user activity data as input to a data model that has been trained using machine learning to cause the data model to output a set of recommended service scores that indicate likelihoods of particular services being appropriate services to recommend to the user,
generate the recommendation data based on the set of recommended service scores, and
determine to provide the user with the service based on the recommendation data.

12. The device of claim 8, wherein the set of entities include at least one of:
an identifier of the user,
an identifier of the software tool,
an identifier of the service management system,
an identifier of a role that the user has within an organization, an identifier of an operation that is capable of being performed as part of the role, or an identifier of a priority level of the service requested by the user.

13. The device of claim 8, wherein the one or more processors, to use the second API to cause the validation procedure to be performed, are to:

identify, based on a service identifier for the service, a subset of entities, of the set of entities, that are to be validated, select, based on the service identifier for the service, the second API to validate particular entity data for one or more entities of the set of entities, and provide, via the second API, a validation request to another device to cause the other device to provide the device with a validation response that indicates whether the particular entity data has been validated.

14. The device of claim 8, wherein the one or more processors are further to:

select, based on a service identifier for the service, a third API, of the plurality of APIs, that is to be used to cause the one or more components of the service management system to execute the set of actions to perform the service; and wherein the one or more processors, to cause the one or more components of the service management system to perform the set of actions to provide the service, are to:

provide the validated entity data to the one or more components of the service management system via the third API to cause the one or more components to execute the set of actions to perform the service.

15. A non-transitory computer-readable medium storing instructions, the instructions comprising:

one or more instructions that, when executed by one or more processors of a device of a chat support platform in communication with a plurality of application interfaces (APIs) that are each associated with one or more different functions associated with a service management system, cause the one or more processors to:

receive, based on a user interaction with a chatbot of the chat support platform, request data for a request for a service associated with a software tool that is part of the service management system;

identify, based on the request data, the service that is being requested;

identify a first API, of the plurality of APIs, based on:
an identification of the service, and
a determination to identify a first set of entity data for a first set of entities relating to the service;

use the first API to identify, based on the request data, the first set of entity data for the first set of entities relating to the service;

select, based on the first set of entity data, a set of tasks to perform in order to provide the service;

identify, a second API, of the plurality of APIs and different from the first API, based on:
the set of tasks, and
a determination to reference a data structure that is associated with the service management system and that stores the second set of entity data;

identify, based on at least one task of the set of tasks, the second set of entity data for the second set of entities by using the second API to reference the data structure that is associated with the service management system and that stores the second set of entity data; and cause, based on at least another task of the set of tasks, one or more components of the service management system to use the first set of entity data and the second set of entity data to execute a set of actions to perform the service.

16. The non-transitory computer-readable medium of claim 15, wherein the first set of entity data and the second set of entity data are collectively a third set of entity data;

wherein the one or more instructions, when executed by the one or more processors, further cause the one or more processors to:

select, based on a service identifier for the service, a third API, of the plurality of APIs, that is to be used to validate a subset of the third set of entity data; and provide, via the third API, a validation request to another device to cause the other device to provide the device with a validation response that indicates whether the subset of the third set of entity data has been validated.

17. The non-transitory computer-readable medium of claim 15, wherein the one or more instructions, that cause the one or more processors to identify the service, cause the one or more processors to:

provide, via the first API, the request data to a machine learning engine to cause the machine learning engine to execute a machine learning module to process the request data and to select a service identifier for the service, from a set of service identifiers for a set of available services; and receive the service identifier for the service via the first API; and wherein the one or more instructions, that cause the one or more processors to use the first API to identify the first set of entity data, cause the one or more processors to:

provide, via the first API, the request data to a natural language processing engine to cause the natural language processing engine to process the request data to identify the first set of entity data for the first set of entities, and receive the first set of entity data via the first API.

18. The non-transitory computer-readable medium of claim 15, wherein the set of actions to perform the service include:

receiving service data from a service management system,
generating response data based on the service data, and
causing the response data to be made available to another device or account associated with a user.

19. The non-transitory computer-readable medium of claim 15, wherein the one or more instructions, when executed by the one or more processors, further cause the one or more processors to:

receive user action data that describes one or more operations performed by the user while accessing the software tool;

provide the user action data as input to the first API to cause a data model that has been trained using machine learning to process the user action data to generate a set of recommended service scores for a set of available services;

generate recommendation data for a recommendation to provide the user with another service based on the set of recommended service scores; and cause the recommendation to be provided to an interface accessible to the user.

20. The non-transitory computer-readable medium of claim 15, wherein the one or more instructions, when executed by the one or more processors, further cause the one or more processors to:
- receive feedback data from a particular user that has identified at least one false positive in the first set of entity data; and
- retrain a data model that is used to identify the first set of entities based on the feedback data.

* * * * *